United States Patent
Perlmutter et al.

(10) Patent No.: US 8,776,017 B2
(45) Date of Patent: Jul. 8, 2014

(54) SCRIPTING LANGUAGE PROCESSING ENGINE IN DATA LEAK PREVENTION APPLICATION

(75) Inventors: Amnon Perlmutter, Givalaim (IL); Aviad Mor, Tel-Aviv (IL); Oded Gonda, Tel Aviv (IL); Ofer Raz, Ramat-Gan (IL); Matt LeGrow, Bethesda, MD (US)

(73) Assignee: Check Point Software Technologies Ltd, Tel Aviv (IL)

( * ) Notice: Subject to any disclaimer, the term of this patent is extended or adjusted under 35 U.S.C. 154(b) by 578 days.

(21) Appl. No.: 12/843,056

(22) Filed: Jul. 26, 2010

(65) Prior Publication Data
US 2012/0023480 A1  Jan. 26, 2012

(51) Int. Cl.
*G06F 9/44* (2006.01)

(52) U.S. Cl.
USPC .............................. 717/115; 717/142; 717/143

(58) Field of Classification Search
None
See application file for complete search history.

(56) References Cited

U.S. PATENT DOCUMENTS

| | | | |
|---|---|---|---|
| 6,266,811 B1 * | 7/2001 | Nabahi | 717/115 |
| 6,460,050 B1 * | 10/2002 | Pace et al. | 1/1 |
| 7,058,939 B2 * | 6/2006 | Berg et al. | 717/115 |
| 7,069,271 B1 * | 6/2006 | Fadel et al. | 705/26.7 |
| 7,149,680 B2 * | 12/2006 | Storisteanu et al. | 717/143 |
| 7,478,092 B2 * | 1/2009 | Warburton et al. | 1/1 |
| 7,484,204 B2 * | 1/2009 | Zatloukal | 717/142 |
| 7,917,900 B2 * | 3/2011 | Rajamani et al. | 717/142 |
| 8,060,860 B2 * | 11/2011 | Linn et al. | 717/115 |
| 8,078,568 B2 * | 12/2011 | Stuhec et al. | 717/143 |
| 8,171,389 B2 * | 5/2012 | Wang et al. | 717/115 |
| 8,402,547 B2 * | 3/2013 | Wiegenstein et al. | 717/143 |
| 8,635,594 B1 * | 1/2014 | Krishnan et al. | 717/115 |
| 2004/0015907 A1 * | 1/2004 | Giel et al. | 717/142 |
| 2004/0059776 A1 * | 3/2004 | Pitzel et al. | 709/203 |
| 2004/0111642 A1 * | 6/2004 | Peles | 717/143 |
| 2005/0240912 A1 * | 10/2005 | Bodin et al. | 717/143 |
| 2006/0242712 A1 * | 10/2006 | Linn et al. | 726/26 |
| 2006/0288015 A1 * | 12/2006 | Schirripa et al. | 707/100 |
| 2008/0276230 A1 * | 11/2008 | Chang et al. | 717/142 |
| 2009/0024612 A1 * | 1/2009 | Tang et al. | 707/5 |
| 2010/0153507 A1 * | 6/2010 | Wei et al. | 709/206 |
| 2013/0014093 A1 * | 1/2013 | Lee | 717/142 |

OTHER PUBLICATIONS

Rose, et al., "Content Awareness in a file System INterface: Implementing the 'Pile' Metaphor for Organizing information"; 1993, ACM; [retrieved on Jan. 31, 2013]; Retrieved from Internet <URL:http://dl.acm.org/citation.cfm?id=160735>; pp. 260-269.*

(Continued)

*Primary Examiner* — Xi D Chen
(74) *Attorney, Agent, or Firm* — Mark M. Friedman

(57) ABSTRACT

A data leak prevention application that categorizes documents by data type is provided, a data type being a sensitivity classification of a document based on what data the document contains. A scripting language processing engine is embedded into the data leak prevention application, the scripting language forming part of the application as hard code. A user configures interaction of the scripting language processing engine with the application. The configuring may include modifying or adding code or setting criteria for when code portions of the scripting language processing engine activates. The scripting language processing engine is activated to enhance an accuracy of an existing data type or so as to detect a new data type. Upon enhancing the accuracy of the data type, documents may be re-categorized.

18 Claims, 12 Drawing Sheets

(56) References Cited

OTHER PUBLICATIONS

Mander, et al., "A 'Pile' Metaphor for Supporting casual Organization of Information"; 1992, ACM; [retrieved on Jan. 31, 2013]; Retrieved from Internet <URL:http://dl.acm.org/citation.cfm?id=143055>; pp. 627-634.*

Dourish, et al., "Using Properties for Uniform Interaction in the Presto Document System"; 1999, ACM; [retrieved on Jan. 31, 2013]; Retrieved from Internet <URL:http://dl.acm.org/citation.cfm?id=322583>; pp. 55-64.*

Clark, "Automated Security Classification", 2008 Capgemini; [retrieved on Jun. 12, 2013]; Retrieved from Internet <URL:http://citeseerx.ist.psu.edu/viewdoc/download?doi=10.1.1.160.2270&rep=rep1&type=pdf>;pp. 1-72.*

Alneyadi, et al., "Adaptable N-gram Classification Model for Data Leakage Prevention"; 2013 IEEE; [retrieved on Feb. 23, 2013]; Retrieved from Internet <URL:http://ieeexplore.ieee.org/stamp/stamp.jsp?tp=&arnumber=6723919>;pp. 1-8.*

Alneyadi, et al., "Word N-gram Based Classification for Data Leakage Prevention"; 2013 IEEE; [retrieved on Feb. 23, 2013]; Retrieved from Internet <URL:http://ieeexplore.ieee.org/stamp/stamp.jsp?tp=&arnumber=6680889>;pp. 578-585.*

Robinson, et al., "GitBAC: Flexible Access Control for Non-Modular Concerns"; 2011 IEEE; [retrieved on Feb. 23, 2013]; Retrieved from Internet <URL:http://dl.acm.org/citation.cfm?id=2190078>;pp. 500-503.*

Yang, et al., "Study on e-Government Construction"; 2005 ACM; [retrieved on Feb. 23, 2013]; Retrieved from Internet <URL:http://dl.acm.org/citation.cfm?id=1089551>;pp. 542-548.*

* cited by examiner

| | A | B | C | D | E | F | G | H |
|---|---|---|---|---|---|---|---|---|
| 1 | Tax ID | Loaner name | Address | ZIP code | Loan type | Loan status | Due date | Balance |
| 2 | 745-62-2515 | RAMIREZ MELISSA | 48 BAILEY St. | 36077 | Normal | Active | 9-Oct-08 | $606,347 |
| 3 | 740-23-2086 | BROWN THOMAS | 28 HOWARD St. | 63100 | Normal | Active | 2-Dec-08 | $594,206 |
| 4 | 740-44-0493 | KING GEORGE | 30 Main Ave. | 52316 | Normal | Active | 26-Mar-09 | $339,071 |
| 5 | 745-02-4259 | PHILLIPS EDWARD | 29 COOPER St. | 47697 | Normal | Active | 16-Oct-06 | $364,079 |
| 6 | 744-51-6884 | WHITE LARRY | 6 BELL St. | 37304 | Normal | Active | 4-Aug-08 | $500,138 |
| 7 | 746-20-0692 | RAMIREZ FRANK | 17 Washingthon Ave. | 65846 | Normal | Active | 12-Sep-08 | $130,355 |
| 8 | 743-82-4965 | MARTINEZ JOSE | 47 MURPHY St. | 44565 | Normal | Active | 8-Apr-09 | $203,075 |
| 9 | 744-38-9298 | NELSON CYNTHIA | 6 Main St. | 23040 | Normal | Active | 1-Jan-09 | $113,714 |
| 10 | 736-61-0078 | MARTIN CHARLES | 16 COOPER Ave. | 27815 | Normal | Active | 27-Sep-06 | $832,990 |
| 11 | 742-50-4386 | TAYLOR KENNETH | 33 COOK Ave. | 88706 | Normal | Active | 20-May-06 | $378,383 |
| 12 | 745-10-5081 | MOORE DEBRA | 14 Washington St. | 19737 | Normal | Active | 1-Oct-07 | $873,697 |
| 13 | 735-39-9536 | TURNER MARTHA | 25 BAILEY St. | 65391 | Normal | Active | 2-Jan-09 | $438,519 |
| 14 | 739-91-4673 | THOMPSON JAMES | 29 BAILEY Ave. | 56768 | Normal | Active | 3-Oct-07 | $266,285 |
| 15 | 737-32-9268 | DAVIS LISA | 3 Village St. | 19227 | Normal | Active | 30-Apr-08 | $31,569 |
| 16 | 747-92-7769 | BAKER AMANDA | 23 Main St. | 41919 | Normal | Active | 9-Jul-06 | $647,579 |
| 17 | 744-81-0093 | PHILLIPS KEVIN | 34 Town Ave. | 20665 | Normal | Active | 17-Nov-07 | $610,602 |
| 18 | 742-83-2269 | HILL PAMELA | 22 MURPHY St. | 26445 | Normal | Active | 14-Jun-06 | $74,108 |
| 19 | 739-19-6525 | GARCIA RONALD | 37 Main St. | 19344 | Normal | Active | 28-Apr-09 | $66,479 |
| 20 | 736-07-6036 | ROBERTS JEFFREY | 44 MORGAN St. | 38225 | Normal | Active | 19-Sep-07 | $427,536 |
| 21 | 735-47-5241 | ROBERTS SANDRA | 33 KELLY Ave. | 14555 | Normal | Active | 21-Sep-08 | $820,049 |
| 22 | 745-28-5734 | WRIGHT JASON | 3 WARD St. | 66741 | Normal | Active | 6-May-06 | $365,064 |
| 23 | 747-19-1667 | HARRIS BARBARA | 14 WARD Ave. | 13802 | Normal | Active | 8-Aug-08 | $984,558 |
| 24 | 746-78-5204 | ADAMS SUSAN | 19 MORRIS St. | 57925 | Normal | Active | 25-Jan-08 | $226,773 |
| 25 | 740-06-7109 | SANCHEZ GREGORY | 14 TORRES St. | 38459 | Normal | Active | 18-Feb-06 | $542,745 |
| 26 | 739-72-9802 | LEWIS BRENDA | 35 Town Ave. | 21209 | Normal | Active | 26-Feb-08 | $994,352 |
| 27 | 742-24-9609 | EVANS MARGARET | 15 REED Ave. | 79950 | Normal | Active | 10-Mar-06 | $730,747 |
| 28 | 741-07-1620 | KING RUTH | 21 COLLINS St. | 56097 | Normal | Active | 16-Jul-08 | $755,160 |
| 29 | 744-40-3935 | ANDERSON HELEN | 45 Main St. | 39104 | Normal | Active | 29-Nov-06 | $956,696 |
| 30 | 737-17-0825 | MOORE NANCY | 3 KELLY St. | 50235 | Normal | Active | 15-Nov-08 | $787,564 |
| 31 | 735-68-4581 | CLARK SARAH | 15 Main St. | 23487 | Normal | Active | 31-May-08 | $544,267 |
| 32 | 744-34-76ZZ | JOHNSON TIMOTHY | 20 Village Ave. | 24576 | Normal | Active | 6-Jun-06 | $621 |

4. Extract and convert to text (UTF-8) –

Over 600 applications supported

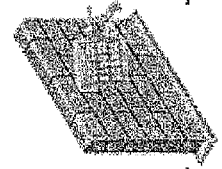

SMTP Envelope
Sender: someone@company.com
Recipients: me@gmail.com

Subject: "Some homework"

Body: "Sincerely ..."

3. MIME Parsing

SMTP Envelope
Sender: someone@company.com
Recipients: me@gmail.com

Subject: "Some homework"

Body: "Sincerely ..."

2. SMTP Parsing

SMTP Envelope
Sender: someone@company.com
Recipients: me@gmail.com
DATA

1. Message intercepted by DLP Blade

Check Point DLP
Software Blade

FIG 7A

SCRIPTING LANGUAGE PROCESSING ENGINE IN DATA LEAK PREVENTION APPLICATION

FIELD AND BACKGROUND OF THE INVENTION

The present invention relates to methods of preventing sensitive data from leaving an organization, and, more particularly to using a scripting language processing engine to prevent such leakage of sensitive data.

Data leak prevention products try to find data which an organization has defined as secret or sensitive in order to prevent it from leaving the perimeters of the organization. This data can be a list of employees, a list of customers, credit cards, different personal identification numbers, source code, and so on. Each of these specific types of data may be referred to a data type. The data types are recognized in different manners: by matching words or phrases out of a custom tailored dictionary of words and phrases, by file type, by regular expressions. A "regular expression" is understood to refer to a defined notation of a DLP product such as the notation "\d(11)", which is a defined PCRE ("Peri Compatible Regular Expressions") notation.

Data leak prevention products cannot, however, handle certain kinds of requests concerning detection of documents or identification of documents having certain data considered to be sensitive in nature or considered to be suspicious in the way it is handled. For example, governmental entities, credit card companies, banks and other large entities which have hundreds of thousands or millions of customers often issue identification numbers unique to each customer. The validation of these identification numbers can be verified by applying a set of mathematical operations to the number. This validation procedure may distinguish the number from most accidentally erroneous numbers and may also protect against use of certain fraudulently created identification numbers by those who may not know about the validation procedure. "Identification numbers" can be anything from taxpayer ID numbers, license plate numbers, bank account numbers, national ID numbers, credit card numbers or other numbers used to uniquely identify individuals amongst a large number of individuals (typically 100,000 or more) who subscribe to, use or are part of a large governmental or private entity.

Each governmental entity or large entity, for example each country in the world, may have its own unique validation procedures applicable to its own identification numbers. As an example, Australian business numbers have been selected so that the following validation function in the form of a mathematical procedure verifies their authenticity. The Australian number must be 11 digits. When one multiplies each of the 11 digits by the following 11 factors: 10, 1, 3, 5, 7, 9, 11, 13, 15, 27 and 19, sums the result and then divides by 89, only if the remainder is zero is the number a valid Australian business number. Other countries and entities select their numbers so that a different mathematical procedure may be used to validate their identification numbers.

If a user using a data leak prevention product would want to detect documents, for example entails, containing five or more Australian business numbers, one available solution would be for the user to create a dictionary of all valid Australian business numbers. That solution would use up a lot of RAM and hard disk resources because of its size (i.e. the order of magnitude of the entries may be $10^{**}9$). Alternatively, the user could try to detect Australian business numbers in the documents by detecting the existence of any eleven-digit number in a document. This may be accomplished by using a regular expression, meaning a PCRE notation of a DLP product, for example "\d(11)". This solution is not very accurate since it will generate way too many false positives.

In the above example, another problem is that it is difficult to establish an appropriate threshold for the number of appearances of a data type in a document, such as an email. Suppose action by a data leak prevention software is triggered by the number of such appearances or supposed the document type is defined by the number of such appearances. In the above example, for example, if all entails having five or more Australian business numbers were flagged, the threshold may be too low and there may be too many false positives. On the other hand, increasing the threshold to ten in order to reduce false positives would not completely eliminate the false positives and may encourage significantly more instances of failing to detect problematic documents that should have been detected, i.e. false negatives.

Another example of a request that a data leak prevention product would typically not be able to handle is detecting mails sent to a particular recipient in which the identity of that recipient also appears in the body of the email. The appearance of the recipient in the body of the email can be an important indicator justifying reduced concern about the appropriateness of the email being sent to the recipient from a security point of view. A further example of a request that a data leak prevention product would normally be unable to handle is a request to define as sensitive entails sent by a particular customer to a certain number of recipients.

There is a compelling need to have an improved method or system that will save sensitive data from leakage outside the organization. There is a further need to have such a system or method that allows the administrator to conveniently categorize documents according to their security sensitivity in response to sophisticated requests.

SUMMARY OF THE PRESENT INVENTION

One aspect of the present invention is directed to a method of categorizing documents by classifying the documents according to a security sensitivity of the documents, comprising providing a data leak prevention application that categorizes documents by data type, a data type being a classification of a document based on what data the document contains; embedding a scripting language processing engine into the data leak prevention application, the scripting language processing engine forming part of the application as hard code; configuring interaction between the scripting language processing engine and the data leak prevention application, the configuring including modifying existing code or adding new language code; and activating relevant code portions of the scripting language processing engine to either detect new date types or to enhance an accuracy of an existing data type.

A further aspect of the present invention is directed to a method of categorizing documents by classifying the documents according to a sensitivity of the documents, comprising embedding a scripting language processing engine into a data leak prevention application, the scripting language processing engine forming part of the application, interaction of the scripting language processing engine with the data leak prevention application being configurable by a user; setting criteria for when relevant code portions of the scripting language processing engine activate; and activating relevant code portions of the scripting language to either validate an existing data type or to detect a new data type, a data type being a classification of a document containing data based on a sensitivity of the document and based on the type of data the document contains.

A still further aspect of the present invention is directed to a method of detecting sensitive documents, comprising using a data leak prevention application to categorize documents by data type, a data type being a classification of a document containing data based on the size of the document and based on the type of data the document contains; categorizing the documents further based on a protocol of the document; for email documents categorizing the email documents further in terms of sensitivity by checking the source and destination of the emails; and a scripting language processing engine embedded in the data leak prevention application validating an accuracy of the data type, interaction of the scripting language processing engine with the data leak prevention application being configurable by a user.

A yet still further aspect of the present invention is directed to a method of detecting sensitive documents, comprising using a data leak prevention application to select a sensitivity category for a document based on a size of the document, a data type and a protocol of the document; checking the source and destination of the document if the protocol is for email; a user configuring interaction of a scripting language processing engine with the data leak prevention application to activate code portions of the scripting language processing engine at a run time event of the data leak prevention application, the scripting language processing engine being embedded in the data leak prevention application and having access to data accessible to the data leak prevention application; a user using the scripting language processing engine to validate the data type of the document; and re-selecting a sensitivity category for the document based on the validation.

A further aspect of the present invention may involve a data leak prevention system, comprising a data leak prevention application; a scripting language processing engine embedded into the DLP application and forming part of the hard code thereof, an interaction of the scripting language processing engine with the data leak prevention application configurable by a user; the scripting language processing engine including snippets that activate based on criteria configurable by a user at run time events of the data leak prevention application, the snippets also modifiable by a user; and documents of various data types stored by the user and categorized by the data leak prevention application as to sensitivity upon the scripting language processing engine validating existing data types or creating new data types.

These and other features, aspects and advantages of the present invention will become better understood with reference to the following drawings, descriptions and claims.

BRIEF DESCRIPTION OF THE DRAWINGS

Various embodiments are herein described, by way of example only, with reference to the accompanying drawings, wherein:

FIG. 1A is a computer screen of fictitious data subject to data leak prevention application, in accordance with an embodiment of the present invention;

FIG. 1D is a computer screen of a data leak protection policy action in accordance with one embodiment of the present invention;

FIG. 1E is a computer screen showing a list of incomplete data types that may be completed by the user, in accordance with one embodiment of the present invention;

FIGS. 7A and 7B are an illustration of five steps taken by a data leak prevention application to parse an email in accordance with one embodiment of the present invention.

DETAILED DESCRIPTION OF THE INVENTION

Figure 1B:
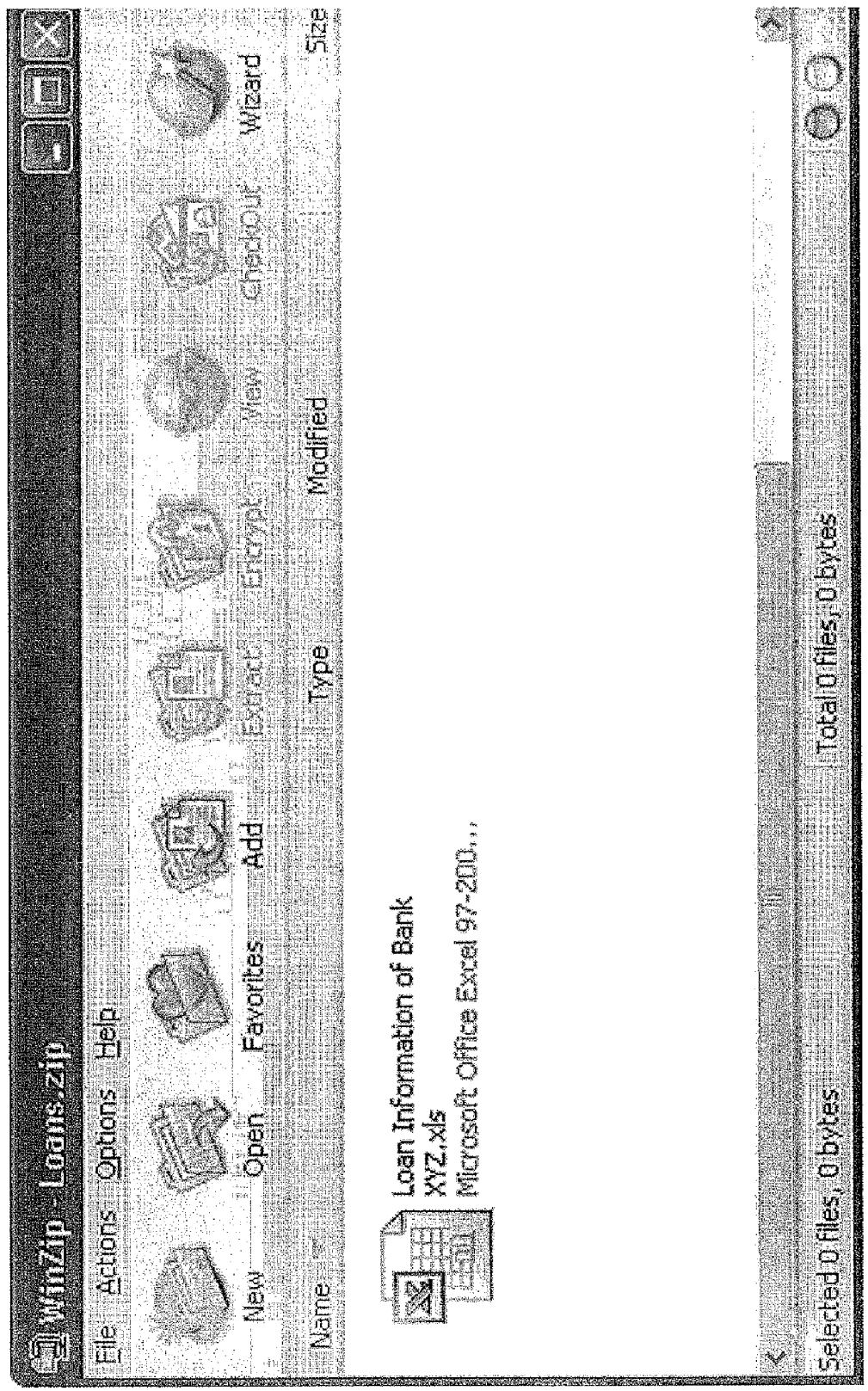
FIG. 1B is a computer screen of a file containing a date type subjected to a data leak protection application, in accordance with an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a method and system of categorizing documents by sensitivity, for example security or business sensitivity and detecting sensitive documents that may be in danger of "leaking" out of an organization. The documents may be categorized by data type, which may consider the data in the document and the size of the document. A data leak prevention application may have embedded into it as hard code a scripting language processing engine. The scripting language processing engine may include code portions. Interaction of the scripting language processing engine with the DLP application may be configured by a DLP administrator with regard to setting criteria for when relevant code portions ("snippets") of the engine activate or regarding modifying or adding code portions.uage processing engine. When there snippets activate, the scripting language processing engine may create a new data type or perform a validation function that may enhance the accuracy of existing data types. Based on the results of the validation, the document may be re-assigned to a different sensitivity category.

In contrast to the prior art, in which categories of documents may be specified for security sensitivity using a dictionary or a list of regular expressions, the method of the present invention may make it possible to create and detect data types using mathematical procedures or algorithms. In further contrast to the prior art, in which data leak prevention methods cannot detect identification numbers or respond to other sophisticated requests reliably with a reasonable amount of resources, the method of the present invention may be able to respond to sophisticated requests and reliably detect identification numbers with a reasonable amount of resources. In further contrast to the prior art, which cannot accurately detect certain data types, the method of the present may be capable of accurately detect a much wider range of possible data types. It may be able to detect data types of all types. In further contrast to the priori art, in which the creation of new data types may require updating product software or firmware sold by the DLP vendor, the method of the present invention may not require any updating of product software or firmware. In still further contrast to the prior art, in which developing new data types for different customers would require releasing new binaries, the method of the present invention may allow development of new data types for different customers without the need to release new binaries. In still further contrast to the prior art, in which enhancing the accuracy of a data type may require developing a new data type, the method of the present invention may allow enhanced accuracy of existing data types without having to create a new data type or to develop new code. In still further contrast of the prior art, in which it is difficult to establish thresholds of the number of appearances of a certain data type, for example an identification number, in a message sufficient to trigger a data leak prevention action, the method of the present invention may enhance the certainty of the validity of the data type, thereby facilitating the establishment of reliable definite thresholds. In contrast to the prior art, in which a purchaser of a data leak prevention (DLP) product has to appeal to the DLP vendor for new functionality whenever the DLP product cannot handle a particular new data type, using the method of the present invention may provide tremendous flexibility to an end customer by allowing the customer to configure the scripting language of the DLP product to handle new data types or enhance accuracy of existing data types tailored to customer's business needs. In further contrast to the prior art, in which a data leak product designed for a customer's business cannot conveniently be shared with multiple customers without updating the software, the method of the present invention may utilize a scripting language that can either be configured once by a distributor or reseller of the application containing the scripting language who provides configuration services to the customers, and have the new configuration be usable by different customers, or the reseller can configure the scripting language differently for different customers.

The principles and operation of the methods of the present invention may be better understood with reference to the drawings and the accompanying description.

The term "data leak" refers to data leaving an organization or leaving control of an organization, for example by being emailed to someone outside the organization to or outside the portion of the organization entitled to have access to the data. This is in contrast to data loss, which broadly may refer to accidental deletion of data by a user or accidental data loss by a computer system processing the data. Some data leak prevention products may be self-styled as "data loss prevention" products. However, the essence of the application, rather than what it is called, should be controlling as to whether it involves data leak prevention, as defined above. Alternatively, data leakage may be thought of as a particular kind of data loss. This patent application is specifically directed to data leak prevention and not prevention of other kinds of data loss.

As used herein a "user" may include an end user, customer or a DLP administrator.

Figure 2:
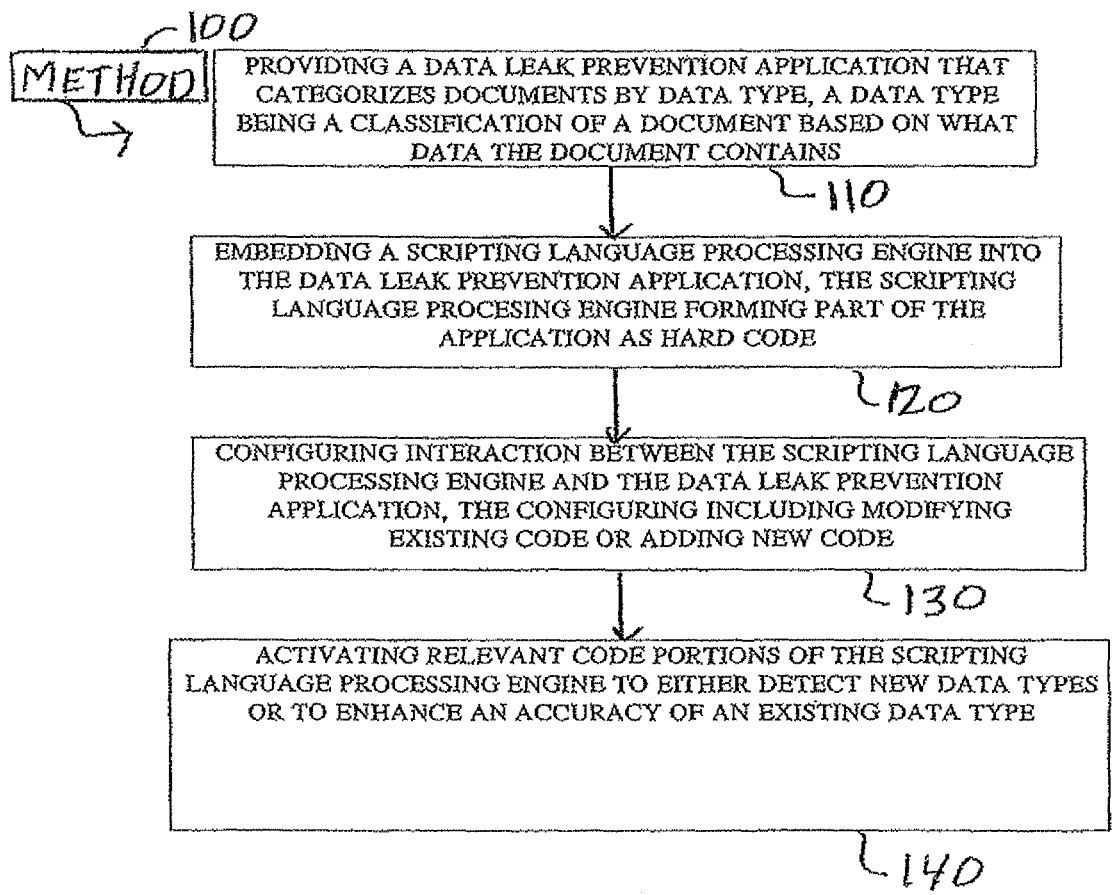
FIG. 2 is a flow chart showing a method in accordance with one embodiment of the present invention.

As seen in FIG. 2, one embodiment of the present invention may be viewed as a method 100 of categorizing documents by classifying the documents according to a security sensitivity of the documents. Method 100 may include a step 110 of providing a data leak prevention application that categorizes documents by data type, a data type being a security sensitivity classification of a document based on what data the document contains. Providing the application or software may include selling or distributing the application or making it available to customers.

Figure 1C:
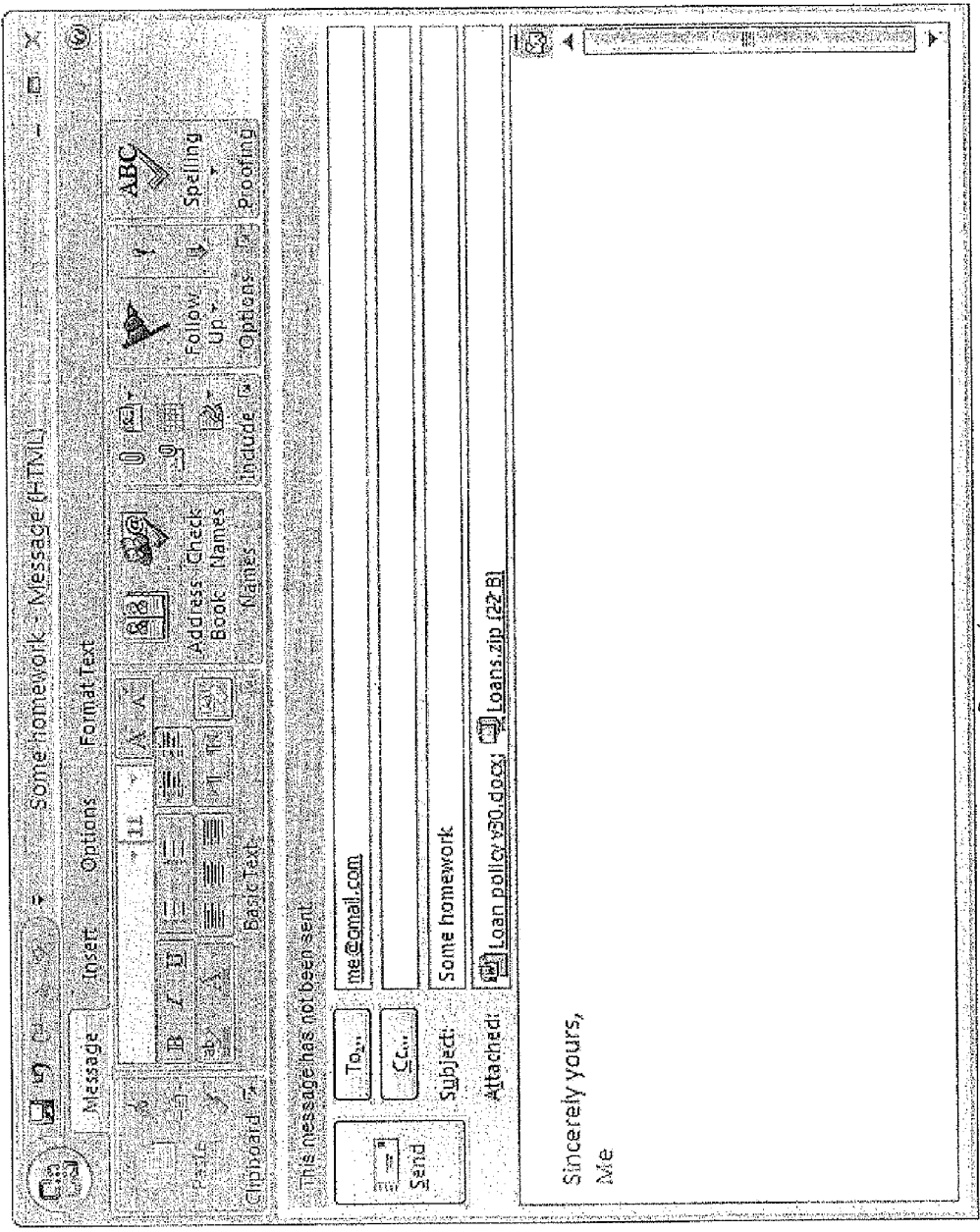
FIG. 1C is a computer screen of an email subjected to a data leak protection application, in accordance with an embodiment of the present invention.
Figure 10:
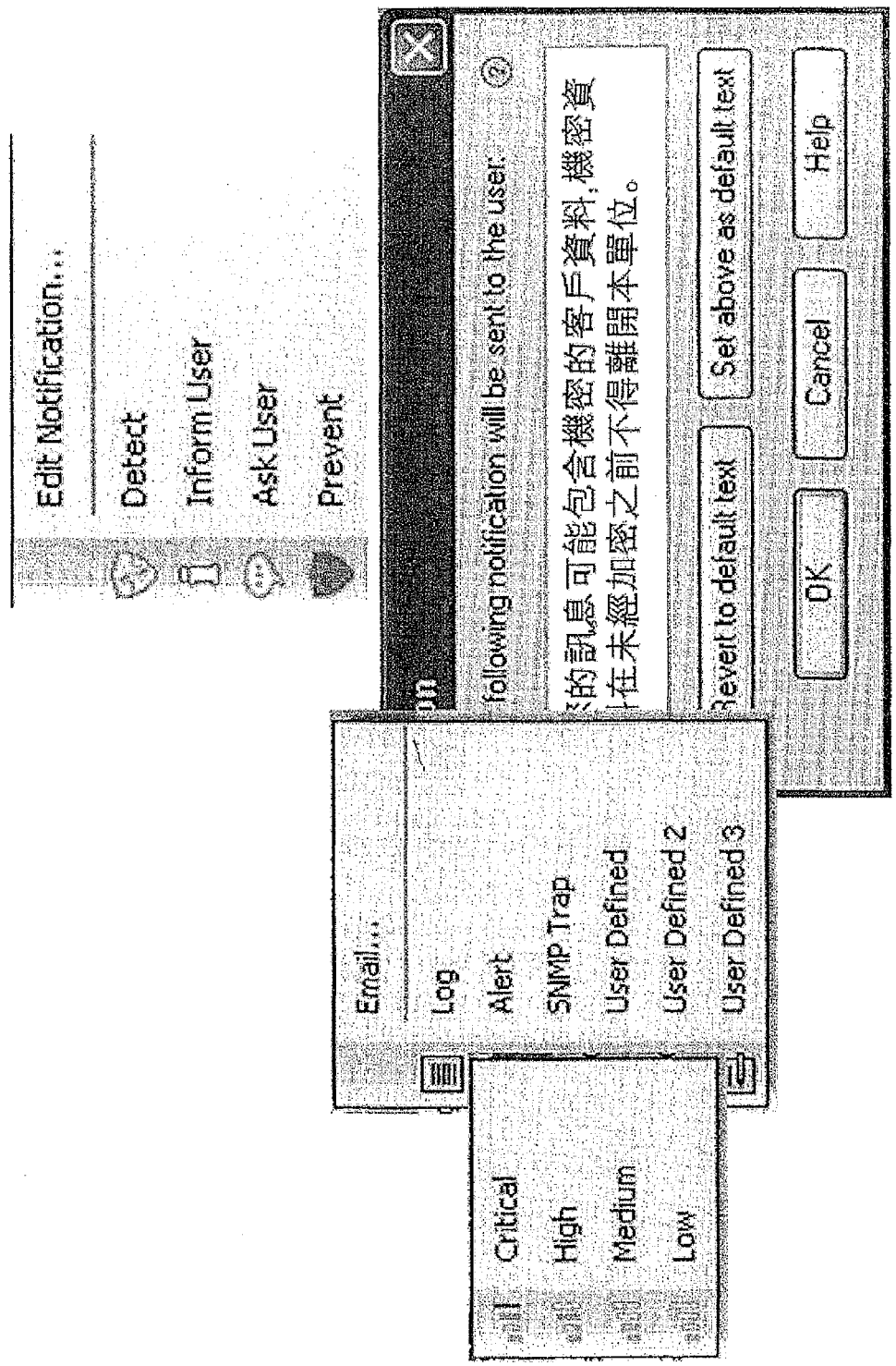
Figure 7B:
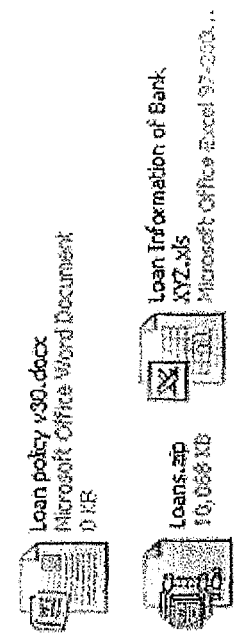

FIGS. 1A through 1D are a series of computer screens showing a data leak prevention application operating on data types. FIG. 1A depicts a computer screen showing an "xls" (Micorosft Excel) format file containing identification information for customers of a bank who have taken out loans from the bank. The file, which may contain ficitious loan information, may be stored on a computer of someone in an organization called Bank XYZ. FIG. 113 depicts a computer screen showing a WinZip window of the file shown in FIG. 1A and entitled "Loan Information of Bank to XYZ. FIG. 1C shows a computer screen of an email that was subjected to a data leak prevention application and was not allowed to be sent. FIG. 1D is an email that is subjected to action by data leak prevention application. FIGS. 7A and 7B show five steps taken by a data leak prevention application to parse an email. These include intercepting the email message, SMTP parsing, MIME parsing, extracting and converting to text and applying DLP policy to each part of the email.

Method 100 may further include a step 120 of embedding a scripting language processing engine into the data leak prevention application. The scripting language processing engine may use a scripting language that may be a high level programming language that is more powerful than a dictionary or a list of regular expressions (i.e. defined notations of a DLP product such as "\d(11)" which is a defined PCRE notation). In some embodiments, this power may extend to data typing and control structures. The scripting language processing engine may form part of the application as hard code.

Method 100 may also include a step 130 of configuring interaction between the scripting language processing engine and the data leak prevention application. The configuring may include modifying existing code or adding new language code, which may be performed by a MP administrator or by a customer. In addition, the configuring may include setting criteria for when the relevant code portions of the scripting language processing engine activates. For example, the relevant code portions of the scripting language processing engine may be set by a DU administrator of the customer (or by the customer) to activate at various run time events of the date leak prevention application or by reference to one of various run time events of the data leak prevention application. Non-limiting examples of reference to such run time events or examples of such run time events may include activation before the data leak prevention rule base runs, after a rule is matched, each each exception to a rule occurs, after a data type is matched or even to upon installation of the data leak prevention policy or upon an update of the data leak prevention application. Data leak prevention policy may refer to designation of which data types may be allowed to be transmitted to which recipients.

In order to offer this flexibility and a rich functionality, the scripting language processing engine may be capable of accessing most or all of the variables that may be available to the data leak prevention application. These may include IP connection details, user name, rule name, data type match, email details (sender, recipients, message subject, body of message), file identification.

Method 100 of the present invention may include a further step 140 of activating the relevant code portions of the scripting language processing engine to either detect new date types or to enhance an accuracy of an existing data type. Activating the relevant code portions of the scripting language processing engine may allow the data leak prevention application to both detect a new data type and to enhance the accuracy of an existing data type. The following is a non-limiting example of relevant code portions of the scripting language processing engine that can be used to enhance the accuracy of an existing data type in a case where the existing data type is "Australian business numbers" mentioned in the Background of the Invention section of this patent application.

The following is an example of code written to validate Australian Business numbers that may be used by a scripting language processing engine in accordance with one embodiment of the present invention.

```
###############################################################
################################################
# VALIDATES:        Australian Business Number

# REGULAR EXPRESSION:   \d{11}    [Example: 53004085616]
#                  # ALGORITHM:        Starting at the first place
multiply with factors: 10, 1, 3, 5, 7, 9, 11, 13, 15, 17 and 19 #
#              The sum is divided by 89, if reminder equals zero, the numner is valid

###############################################################
################################################
func run
{
        if ( (global:CONTENT == NULL) || (global:INDEX_IN_CONTENT == NULL) ||
(global:INDEX_IN_CONTENT < 11) )
                return 0;
        # Get string for validation from email CONTENT
        $chk_num = substr(global:CONTENT, (global:INDEX_IN_CONTENT - 10), 11);
        $new_string = toupper($new_string);
        $index = 0;
        $sum = 0;
        # Runs of the matched number to perform algorithm
        while($index < 11)
        {
                if ($index == 0)
                        $number = ((byte($new_string, $index) - 48) - 1) * 10;
                else
                        $number = (byte($new_string, $index) - 48) * ((2 * $index) - 1);
        $sum = $sum + $number;
        $index = $index + 1;
        }
        # Number is valid if no reminder left when dividing the sum in 89
        if ($sum % 89)
                return 0;
        else
                return 1;
}
```

Figure 3:
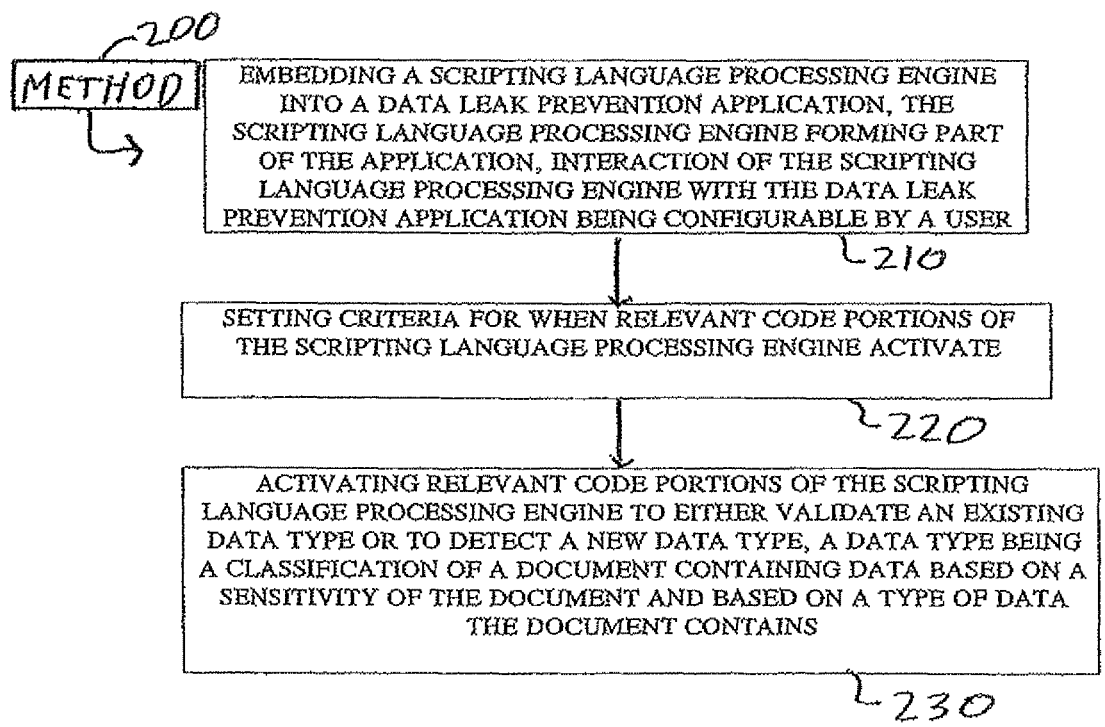
FIG. 3 is a flow chart showing a method in accordance with one embodiment of the present invention.

As seen from FIG. 3, the present invention may also be characterized as a method 200 of categorizing documents by classifying the documents according to a security sensitivity of the documents, comprising several steps. In a first step 210 of method 200, the scripting language processing engine may be embedded into a data leak prevention application so that the scripting language processing engine forms part of the application. Interaction of the scripting language processing engine with the data leak prevention application may be configurable by a DLP administrator or by a customer or user. A second step 220 may involve setting criteria for when the relevant code portions of the scripting language processing engine activates. Method 200 may include a further step 230 of activating the relevant code portions of the scripting language processing engine to either validate an existing data type or to detect a new data type, a data type being a classification of a document containing data based on the sensitivity of the document and based on the type of data the document contains. "Sensitivity" of a document may or may not include security sensitivity of the document.

Figure 4:
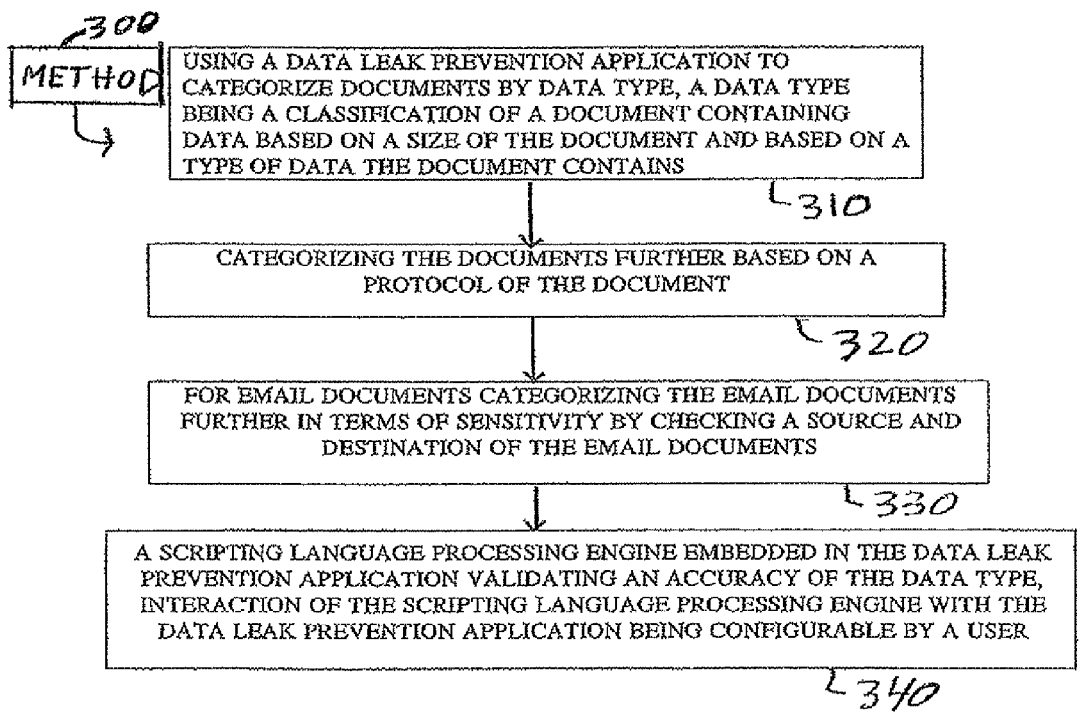
FIG. 4 is a flow chart showing a method in accordance with one embodiment of the present invention.

FIG. 4 shows a flow chart of a method 300 of detecting security sensitive documents. Method 300 may include a step 310 of using a data leak prevention application to categorize documents by data type where a data type is a classification of a document containing data based on the size of the document and based on the type of data the document contains. Step 320 may comprise categorizing the documents further based on a protocol of the document. The protocol may include HTTP, SMTP, FTP, HTTPS etc. The data type matching rules for emails may be different from the rules for HTTP protocols. Emails by their nature involve sending something in a certain format from one party to another party. Consequently, as seen in FIG. 1C, a data type for email protocol (SMTP) may be definable in terms of the sender, recipient, subject, etc., something that may not be the case for data in other protocols.

Accordingly, method 300 may comprise a step 330 for email documents wherein the email documents are categorized further in terms of security sensitivity by checking the source and destination of the emails. Method 300 may further comprise a step 340 wherein a scripting language processing engine embedded in the data leak prevention application may validate the accuracy of the data type. Interaction of the scripting language processing engine with the data leak processing application may be configurable by the user.

The data types referred to in the methods of the present invention may include complex data types and compound data types. "Complex data types" data types may to include string, list, maps, addresses, patterns. "Compound" data type means a data type that is comprised of a combination of several data types.

Furthermore, the scripting language processing engine of any of the methods of the present invention may have features that allow the scripting language processing engine to be used in security-critical software. An example of security-critical software is Sandbox, i.e. a security mechanism for separating running programs. Features of the scripting language processing engine that may support its use in security-critical software may include Sandbox that includes NULL safety and Tick limit protection, recursion, multiple scopes, multiple nested namespaces, an extensive runtime library and complex data types.

Figure 5:
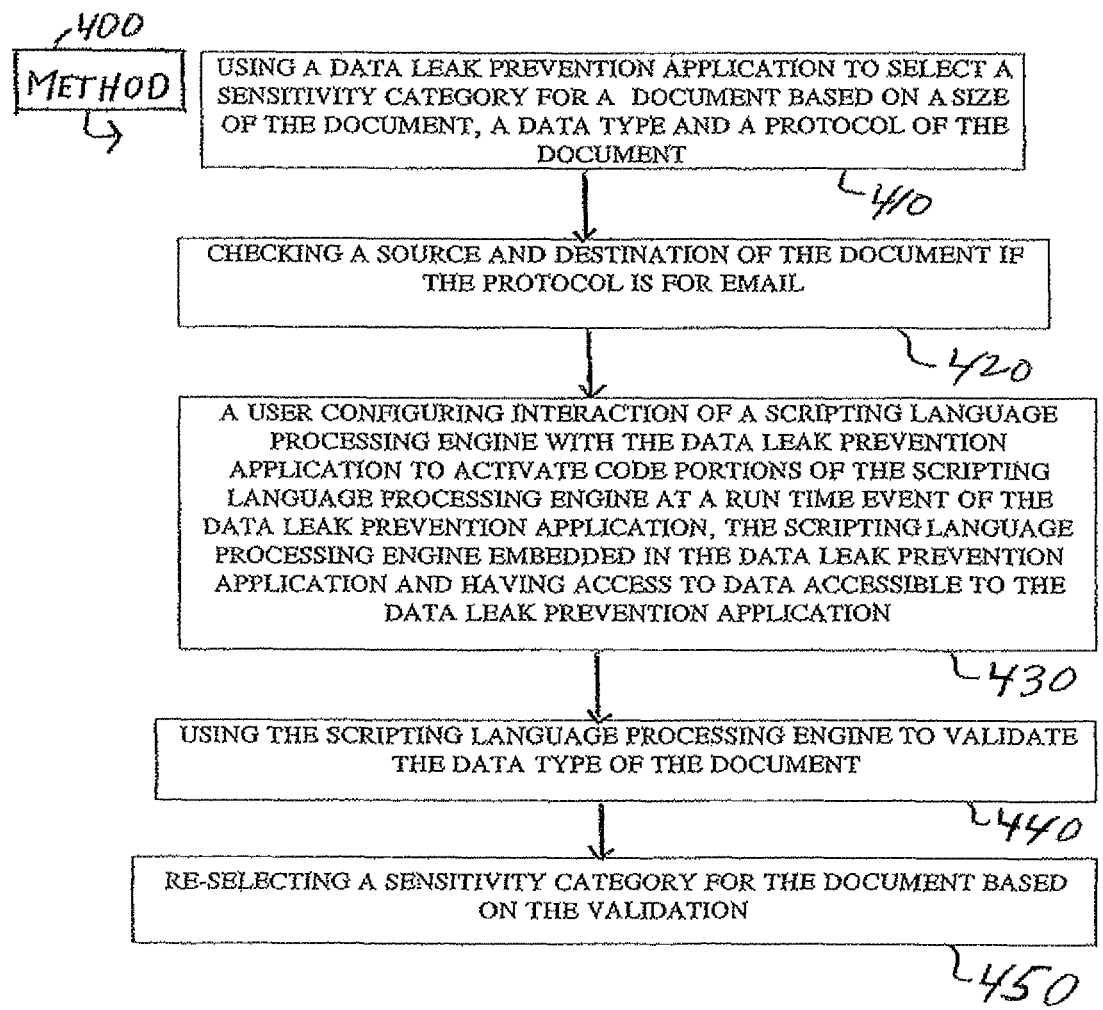
FIG. 5 is a flow chart showing a method in accordance with one embodiment of the present invention.
Figure 6:
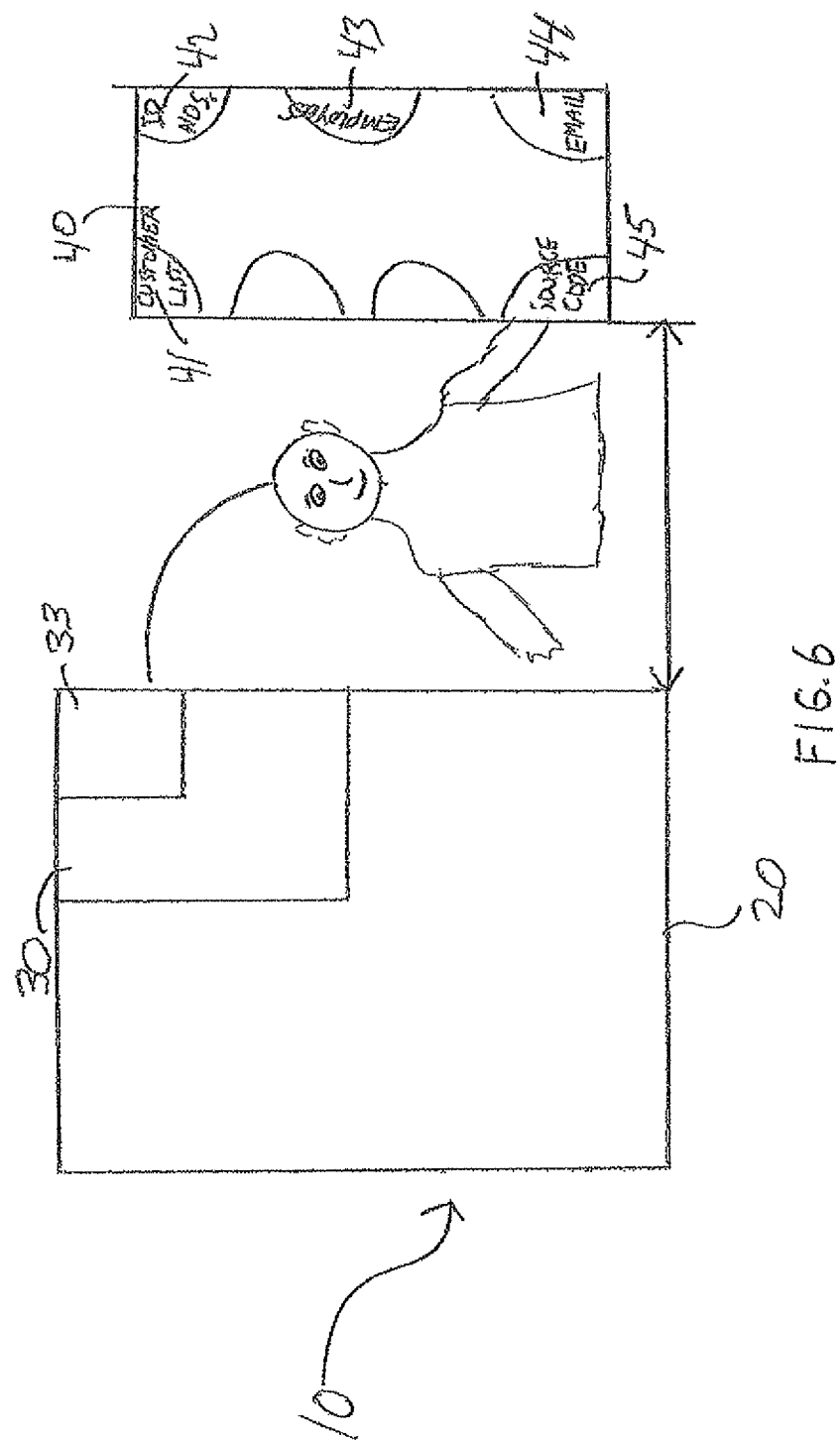
FIG. 6 is a schematic of a system in accordance with one embodiment of the present invention.

As seen in FIG. 5, the present invention may also be characterized as a method 400 of detecting sensitive documents, comprising several steps. "Sensitive" or "sensitivity" may refer in a particular case to security sensitive documents or it may refer in other cases to documents, such as customer lists, that may have business sensitivity. A first step 410 of method 400 may comprise using a data leak prevention application to select a sensitivity category for a document based on a size of the document, a data type and a protocol of the document. Step 420 may comprise checking the source (sender of the email) and destination (recipient of the email) of the document if the protocol is for email. Other steps may include checking other components of an email document that define the email. For example, SMTP protocol may also be defined by a subject of the email and/or by a body of the email.

Step 430 of method 400 may involve a user configuring interaction of the scripting language processing engine with the data leak prevention application to activate relevant cod eportions of the scripting language processing engine at a run time event of the data leak prevention application. As noted, the run time event that may be referenced may include activation before the data leak prevention rule base runs, after a rule is matched, each each exception to a rule occurs, after a data type is matched or even upon installation of the data leak prevention policy or upon an update of the data leak prevention application. The scripting language processing engine may be embedded in the data leak prevention application and may have access to all or to most of the data accessible to the data leak prevention application such as IP connection details, user name, rule name, data type match, email details, file identification.

Method 400 may further include a step 440 of a user using the scripting language processing engine to validate the data type of the document. If the data type is an identification number, validating the data type may mean checking that the identification number is valid.

A further step 450 may involve re-selecting a sensitivity category (which may be a security sensitivity category) for each of the documents based on the results of the validation. For example, some of the documents that previously were defined to include a threshold number of Australian business numbers may now be defined differently since some or all of the numbers previously thought to be Australian business numbers may not be valid Australian business numbers.

Any of methods 100 through 400 may also in some cases involve a step of using the data leak prevention application to perform an action to either block further dissemination of the document or to alert select individuals regarding dissemination of the document. In addition, any of methods 100 through 400 may include a step of selecting the sensitivity category of the document based on a data type characterized by a frequency of occurrence in the document of an identification number.

The present invention may also be characterized as a data leak prevention system 10 that categorizes documents of various data type by their sensitivity. System 10 may comprise a data leak prevention application 20, a scripting language processing engine 30 embedded into the DLP application 20 and documents 40 of various data types 41, 42, 43, 44, 45, etc. The data leak prevention application may be in the form of a DLP product that may be available off the shelf yet may be configurable by a user to suit the user's needs. The scripting language processing engine 30 may include code portions ('snippets") 33. Interaction of the scripting language processing engine 30 with the DLP application 20 may be configured by a user 50 with regard to setting criteria for when relevant code portions 33 of the engine 30 activate or regarding modifying or adding code portions 33. The relevant code portions 33 or snippets 33 may activate based on criteria configurable by a user at run time events of the data leak prevention application 20. The snippets 33 may also be modifiable by a user. The user that modifies or adds to code portions 33 of scripting language processing engine 30 may not be the same user as the user that configures interaction between the engine 30 and the application 20. For example, a DLP administrator may add to or modify the code portions 33 whereas the customer itself may configure the interaction between the engine 30 and the application 20.

System 10 also may include documents 40 of various data types stored by the user and categorized by the data leak prevention application 20 as to sensitivity upon the scripting language processing engine 30 validating existing data types 41, 42, 43, 44, etc. or creating new data types, 41, 42, 43, 44, 45, etc.

Figure 1E:
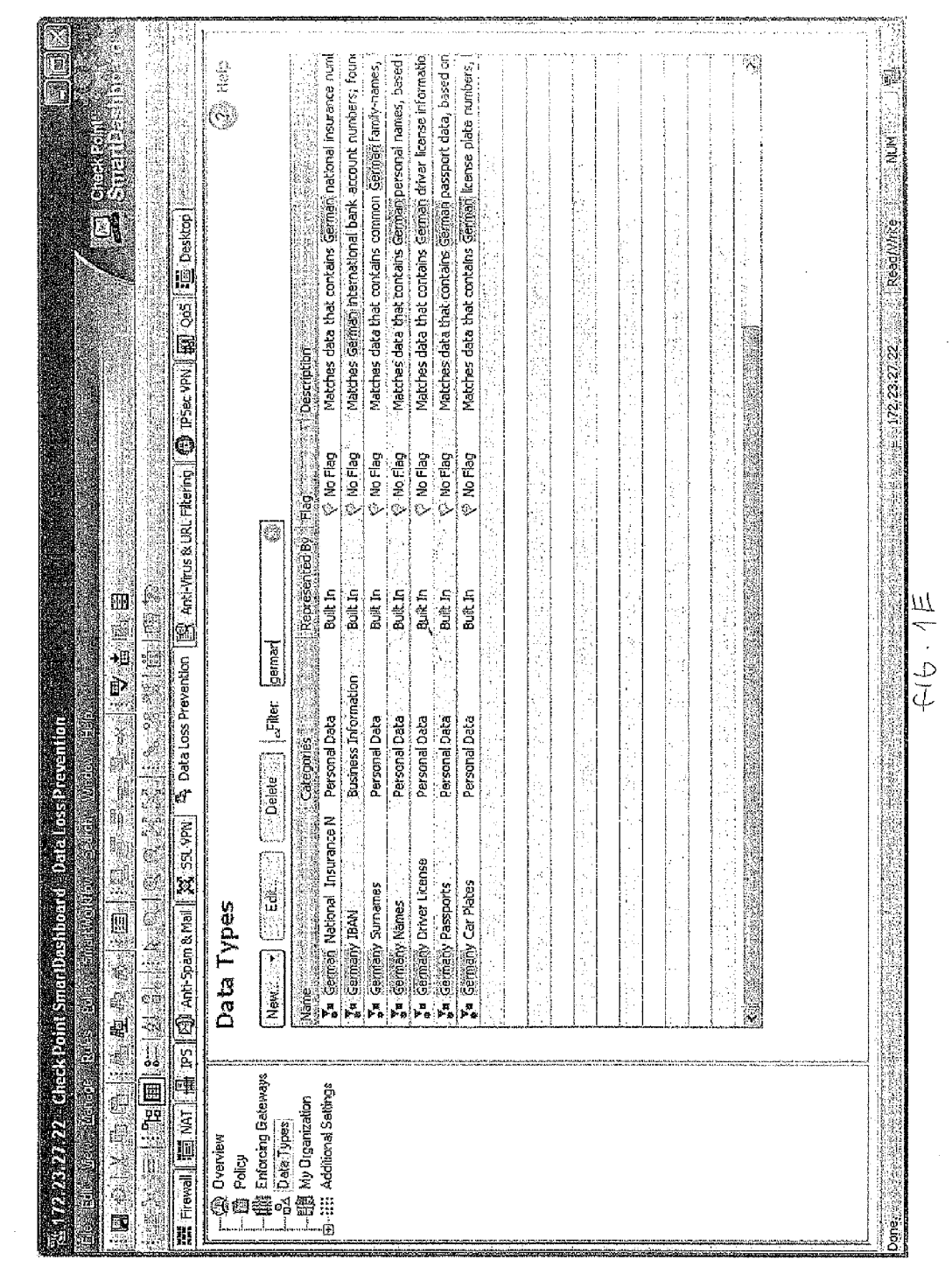

System 10 may also allow personalizing of data types. FIG. 1E shows a list of incomplete data types that may be flagged.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A computer implemented method of preventing leakage of security sensitive documents from an organization involving categorizing documents by classifying the documents according to a security sensitivity of the documents, comprising:

providing a data leak prevention application that categorizes documents by data type in order to prevent leakage of sensitive documents from an organization, a data type being a classification of a document based on what data the document contains, the data type also reflecting an extent to which leakage of the document out of the organization would harm the organization due to what data the document contains;

embedding a scripting language processing engine into the data leak prevention application, the scripting language processing engine forming part of the application as hard code and utilizing a high level programming language;

configuring interaction between the scripting language processing engine and the data leak prevention application, the configuring including modifying existing code or adding new code;

activating relevant code portions of the scripting language processing engine to detect new data types, including setting criteria for when the relevant code portions of the scripting language processing engine activate; and using the data leak prevention application containing the embedded scripting language processing engine to perform an action to prevent data leakage of the document out of the organization based on new and existing data types.

2. The method of claim 1, wherein a data leak prevention (DLP) administrator performs the configuring.

3. The method of claim 1, further including activating the relevant code portions of the scripting language to enhance the accuracy of the existing data types.

4. A computer implemented method of preventing leakage of security sensitive documents from an organization by classifying the documents according to a sensitivity of the documents, comprising:

embedding a scripting language processing engine into a data leak prevention application, the scripting language processing engine forming part of the application, interaction of the scripting language processing engine with the data leak prevention application being configurable by a user;

setting criteria for when relevant code portions of the scripting language processing engine activate so as to validate that a particular document is of a particular existing data type or so as to detect that the particular document fits a particular new data type;

activating relevant code portions of the scripting language to either validate an existing data type or to detect a new data type, a data type being a classification of a document containing data based on a sensitivity of the document and based on a type of data the document contains, the sensitivity of the document reflecting an extent to which leakage of the document out of the organization would harm the organization; and using the data leak prevention application containing the embedded scripting language processing engine to perform an action to prevent data leakage of the document out of the organization based on new and existing data types.

5. The method of claim 4, wherein a DLP administrator sets the criteria.

6. The method of claim 4, wherein the scripting language processing engine has access to variables available to the data leak prevention application.

7. The method of claim 6, wherein the variables include Internet Protocol (IP) connection details, user names, rule names, data type match, email details and file identification.

8. The method of claim 4, further including activating the relevant code portions of the scripting language processing engine to detect a new data type.

9. The method of claim 4, further including activating the relevant code portions of the scripting language processing engine to validate an existing data type.

10. A computer-implemented method of detecting and preventing leakage of sensitive documents out of a particular organization, comprising:

using a data leak prevention application to categorize documents by data type, a data type being a classification of a document containing data based on the size of the document and based on a type of data the document contains;

categorizing the documents further based on a protocol of the document;

for email documents, categorizing the email documents further in terms of sensitivity by checking a source and destination of the email documents, the sensitivity of the email documents reflecting an extent to which leakage of the email document of the organization would harm that particular organization; and a scripting language processing engine embedded in the data leak prevention application validating an accuracy of the data type, interaction of the scripting language processing engine with the data leak prevention application being configurable by a user; and using the data leak prevention application containing the embedded scripting language processing engine to perform an action to prevent data leakage of the document out of the organization.

11. The method of claim 10, wherein the data type includes compound data types.

12. The method of claim 10, wherein the scripting language has features that allow the scripting language processing engine to be used in security-critical software.

13. A computer-implemented method of detecting and preventing leakage of sensitive documents from a particular organization, comprising:

using a data leak prevention application to select a sensitivity category for a document based on a size of the document, a data type and a protocol of the document, the sensitivity category reflecting an extent to which leakage of the document out of the organization would harm that particular organization;

checking a source and destination of the document if the protocol is for email;

a user configuring interaction of a scripting language processing engine with the data leak prevention application to activate code portions of the scripting language processing engine at a run time event of the data leak prevention application, the scripting language processing engine embedded in the data leak prevention application and having access to data accessible to the data leak prevention application;

using the scripting language processing engine to validate the data type of the document;

re-selecting a sensitivity category for the document based on the validation; and using the data leak prevention application containing the embedded scripting language processing engine to perform an action to prevent data leakage of the document out of the organization based on the re-selection of the sensitivity category for the document.

14. The method of claim 13, further including using the data leak prevention application to perform an action to block further outgoing dissemination of the document out of the organization.

15. The method of claim 14, wherein the data accessible to the data leak prevention application includes IP connection details, user name, rule name, data type match, email details or file identification.

16. The method of claim 13, further including selecting the sensitivity category of the document based on a data type characterized by a frequency that an identification number occurs in the document, the identification number identifying an individual customer, individual subscriber, individual citizen or individual member of the particular organization, the identification number occurring in the document unrelated to any step performed by the data leak prevention application applied on the document.

17. The method of claim 16, wherein validating the data type means validating the identification number.

18. A data leak prevention system for an organization, comprising:

a processor;

a data leak prevention (DLP) application executable by the processor;

a scripting language processing engine embedded into the DLP application and forming part of the hard code thereof, an interaction of the scripting language processing engine with the data leak prevention application configurable by a user; the scripting language processing engine including snippets that activate based on criteria configurable by a user at run time events of the data leak prevention application, the snippets also modifiable by a user, the scripting language processing engine configurable by a user to identify whether a document should be assigned a data type based on at least one of (i) a presence and (ii) a frequency of appearance, in the document of a valid identification number, the identification number identifying at least one of an individual customer, individual member, individual citizen or individual subscriber of the organization, the identification number's presence or frequency in the document unrelated to any step performed by the data leak prevention application on the document; and documents of various data types stored by the user and categorized by the data leak prevention application as to sensitivity upon the scripting language processing engine validating existing data types or creating new data types, the sensitivity reflecting an extent to which leakage of the document out of the organization would harm the organization.

* * * * *